US 7,908,228 B2

(12) United States Patent
Leroux et al.

(10) Patent No.: US 7,908,228 B2
(45) Date of Patent: Mar. 15, 2011

(54) ACCRUALS DETERMINATION

(75) Inventors: Fabien Leroux, Grenoble (FR); Claire Haese, Grenoble (FR); Emmanuelle Durand, Prelenfrey (FR); Joyce Becker, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2167 days.

(21) Appl. No.: 10/738,662

(22) Filed: Dec. 16, 2003

(65) Prior Publication Data
US 2005/0027660 A1 Feb. 3, 2005

(30) Foreign Application Priority Data

Jul. 31, 2003 (EP) .................................. 03291936

(51) Int. Cl.
*G06Q 99/00* (2006.01)
(52) U.S. Cl. ............................ 705/400; 705/1.1; 705/26
(58) Field of Classification Search .................. 705/400, 705/1, 7, 26, 29, 1.1, 335, 10
See application file for complete search history.

(56) References Cited

U.S. PATENT DOCUMENTS

| 5,063,506 | A | 11/1991 | Brockwell et al. |
| 5,222,018 | A | 6/1993 | Sharpe et al. |
| 6,219,653 | B1 * | 4/2001 | O'Neill et al. ............... 705/400 |
| 6,571,149 | B1 | 5/2003 | Hahn-Carlosn |
| 7,200,569 | B2 * | 4/2007 | Gallagher et al. ............. 705/31 |
| 2002/0007618 | A1 * | 1/2002 | Armington et al. ............ 53/472 |
| 2002/0019759 | A1 * | 2/2002 | Arunapuram et al. ........... 705/7 |
| 2002/0095347 | A1 * | 7/2002 | Cummiskey ................... 705/26 |
| 2003/0200111 | A1 * | 10/2003 | Damji ............................. 705/1 |

OTHER PUBLICATIONS

Whalen, Jim; "Weighing in on Performance Measurements", May 2002, Logistics Management and Distribution Report, pp. 3-35.*
Certified EP application application No. 03291936.7 filing date: Jul. 31, 2003.

* cited by examiner

*Primary Examiner* — John W Hayes
*Assistant Examiner* — Freda A Nelson

(57) ABSTRACT

A computer-based method of determining freight cost accruals pertaining to shipments provided by transportation providers for an ordering party having cost units. The method includes using input data which comprises shipment-related data, at least some of which is related to the cost units; calculating, on the basis of the input data, the expected freight costs for the shipments, split-up into cost units; and accumulating the expected freight costs individually for different cost units so that cost-unit-individual freight cost accruals are obtained.

9 Claims, 7 Drawing Sheets

ACCRUALS

| ACCOUNTING FILE | PRODUCT LINE (COST UNIT) | AMOUNT | MONTH |
|---|---|---|---|
| 3851 A | 1N00 | 169.27 | 2002-09 |
| 3851 A | 4X00 | 281.50 | 2002-09 |
| 3851 A | 5T00 | 1,161.16 | 2002-09 |
| 3851 A | 7A00 | 2.33 | 2002-09 |
| 2570 B | 0 | 1,614.26 | 2002-09 |
| 3851 A | 1N00 | 8.83 | 2002-10 |
| 3851 A | 4X00 | 28.32 | 2002-10 |
| 3851 A | 5T00 | 1,655.41 | 2002-10 |
| 3851 A | 7A00 | 439.70 | 2002-10 |
| 2570 B | 0 | 2,132.26 | 2002-10 |

FIG. 5

ACCRUALS DETERMINATION

FIELD OF THE INVENTION

The present invention relates to accruals determination and, for example to a method, a computer system and a computer program product for determining freight cost accruals.

BACKGROUND OF THE INVENTION

In many business processes, the "value added chain" includes the transportation of goods. Typically, it is effected by transportation providers for an ordering party.

The processing of the freight costs, which is usually carried out by the ordering party or a freight-cost-management service provider acting for the ordering party, goes through different stages. First, the transportation provider, after having carried out a transportation order, typically sends a shipment notification to the ordering party which confirms that the ordered shipment has been carried out. Later, the transportation provider sends an invoice for the shipment to the ordering party, where sometimes several shipments are listed as invoice items in a single invoice. Typically, the ordering party then verifies that the invoice amount is justified in an auditing procedure, approves the invoice, books the invoice in its bookkeeping system and, finally, pays the invoice.

Typically, as soon as the invoice is booked, the freight costs caused by the transportation service provided are automatically entered into the ordering party's balance. However, there may be a considerable time interval between the shipment and the booking of the corresponding invoice. In order to have detailed knowledge of an enterprise's economic situation it is also desirable to take into account the incurred, but not yet booked freight costs in a contemporary manner. Incurred costs that have not yet been booked, and which have accumulated over a certain period of time, are called "accruals". In at least some jurisdictions, it is mandatory to take the accruals into account in the ordering party's balance.

In businesses in which the incurred freight costs fluctuate considerably from month to month and year to year, it would be seriously imprecise to use average amounts as accruals. In order to obtain a more precise estimate of the accruals the transportation providers are usually required to provide a pre-advice of the individual expected freight cost, e.g. together with the shipment notice, or to provide accumulated estimated freight costs in short time periods (e.g. daily).

However, the accuracy of the accruals amount then depends on the reliability of the transportation provider's pre-advice. Furthermore, since the transportation provider is typically not aware of what was actually transported, he cannot provide pre-advice of the incurred freight costs split up into the ordering party's different cost units (e.g. product lines) which would enable the ordering party to allocate the incurred freight costs to the different cost units.

Systems for automatically determining freight costs and producing freight bills are, for example, known from U.S. Pat. Nos. 6,571,149 B1 and 5,222,018. U.S. Pat. No. 6,219,653 B1 discloses a freight calculation platform which enables users to forecast freight costs in order to facilitate negotiations and agreements between transportation providers and ordering parties, before the transportation services are actually provided. U.S. Pat. No. 5,063,506 discloses a cost estimation system for estimating the cost of supplying parts to a manufacturing facility, which includes the freight cost.

SUMMARY OF THE INVENTION

A first aspect of the invention is directed to a method of determining freight cost accruals pertaining to shipments provided by transportation providers for an ordering party, the ordering party having cost units. According to the first aspect, the method comprises: using input data which comprises shipment-related data, at least some of which is related to the cost units; calculating, on the basis of the input data, the expected freight costs for the shipments, split-up into cost units; accumulating the expected freight costs individually for different cost units so that cost-unit-individual freight cost accruals are obtained.

According to another aspect, a computer-based method is provided of determining freight cost accruals pertaining to shipments provided by transportation providers for an ordering party, the ordering party having cost units. The method comprises: using input data which comprises shipment-related data, at least some of which is related to the cost units; ascertaining whether an invoice for a shipment has already been received, but not yet booked; in response to a positive outcome, using the invoiced amount as freight cost for this shipment, and splitting it up into the cost units concerned, according to the cost-unit-related information in the input data; if no invoice has been received for this shipment, calculating the expected freight costs for this shipment, split up into the cost units concerned, on the basis of the input data; accumulating the invoiced or expected freight costs individually for different cost units so that cost-unit-individual freight cost accruals are obtained.

According to another aspect, a computer-based method is provided of determining freight cost accruals pertaining to shipments provided by transportation providers for an ordering party. The method comprises: using input data which comprises shipment-related data; calculating, on the basis of the input data, the expected freight costs for the shipments; ascertaining whether an invoice for a shipment has already been received, but not yet booked; in response to a positive outcome, comparing the invoiced amount with the calculated expected freight cost for this shipment; in response to a deviation between the invoiced amount and the calculated expected freight cost, re-calculating the expected freight cost and using the re-calculated freight cost as the expected freight cost for this shipment; accumulating the expected freight costs to obtain freight cost accruals.

According to another aspect, a computer system is provided for determining freight cost accruals pertaining to shipments provided by transportation providers for an ordering party having cost units. The computer system comprises: an expected-freight-cost-calculation component arranged to calculate, on the basis of shipment-related, and, at least partially, cost-unit-related input data, expected freight costs for the shipments, split-up into cost units; an accumulation component arranged to accumulate the expected freight costs individually for different cost units to obtain cost-unit-individual freight cost accruals.

According to another aspect, a computer system is provided for determining freight cost accruals pertaining to shipments provided by transportation providers for an ordering party. The computer system comprises: an expected-freight-cost-calculation component arranged to calculate, on the basis of shipment-related input data, expected freight costs for the shipments; an invoice-correlation component arranged to ascertain whether an invoice for a shipment has already been received, and whether a received invoice has already been booked; a comparing component arranged to compare an invoiced amount with the calculated expected freight cost, when an invoice for this shipment has already been received, but not yet booked; a re-calculating component arranged to re-calculate the expected freight cost and set the re-calculated freight cost as the expected freight cost in response to a deviation between the invoiced amount and the calculated expected freight cost; an accumulation component arranged to accumulate the expected freight costs to obtain freight cost accruals.

According to another aspect a computer program product is provided including program code, when executed on a computer system, for determining freight cost accruals pertaining to shipments provided by transportation providers for an ordering party having cost units. The program code is arranged to: use input data which comprises shipment-related data, at least some of which is related to the cost units; calculate, on the basis of the input data, the expected freight costs for the shipments, split-up into cost units; accumulate the expected freight costs individually for different cost units so that cost-unit-individual freight cost accruals are obtained.

According to another aspect, a computer program is provided including program code, when executed on a computer system, for determining freight cost accruals pertaining to shipments provided by transportation providers for an ordering party. The program code is arranged to: use input data which comprises shipment-related data; calculate, on the basis of the input data, the expected freight costs for the shipments; ascertain whether an invoice for a shipment has already been received, but not yet booked; in response to a positive outcome, compare the invoiced amount with the calculated expected freight cost for this shipment; in response to a deviation between the invoiced amount and the calculated expected freight cost, re-calculate the expected freight cost and using the re-calculated freight cost as the expected freight cost for this shipment; accumulate the expected freight costs to obtain freight cost accruals.

Other features are inherent in the methods and products disclosed or will become apparent to those skilled in the art from the following detailed description of embodiments and its accompanying drawings.

DESCRIPTION OF THE DRAWINGS

Embodiments of the invention will now be described, by way of example, and with reference to the accompanying drawings, in which:

FIG. 5 shows an exemplary accruals table;

DESCRIPTION OF EMBODIMENTS

Figure 1:
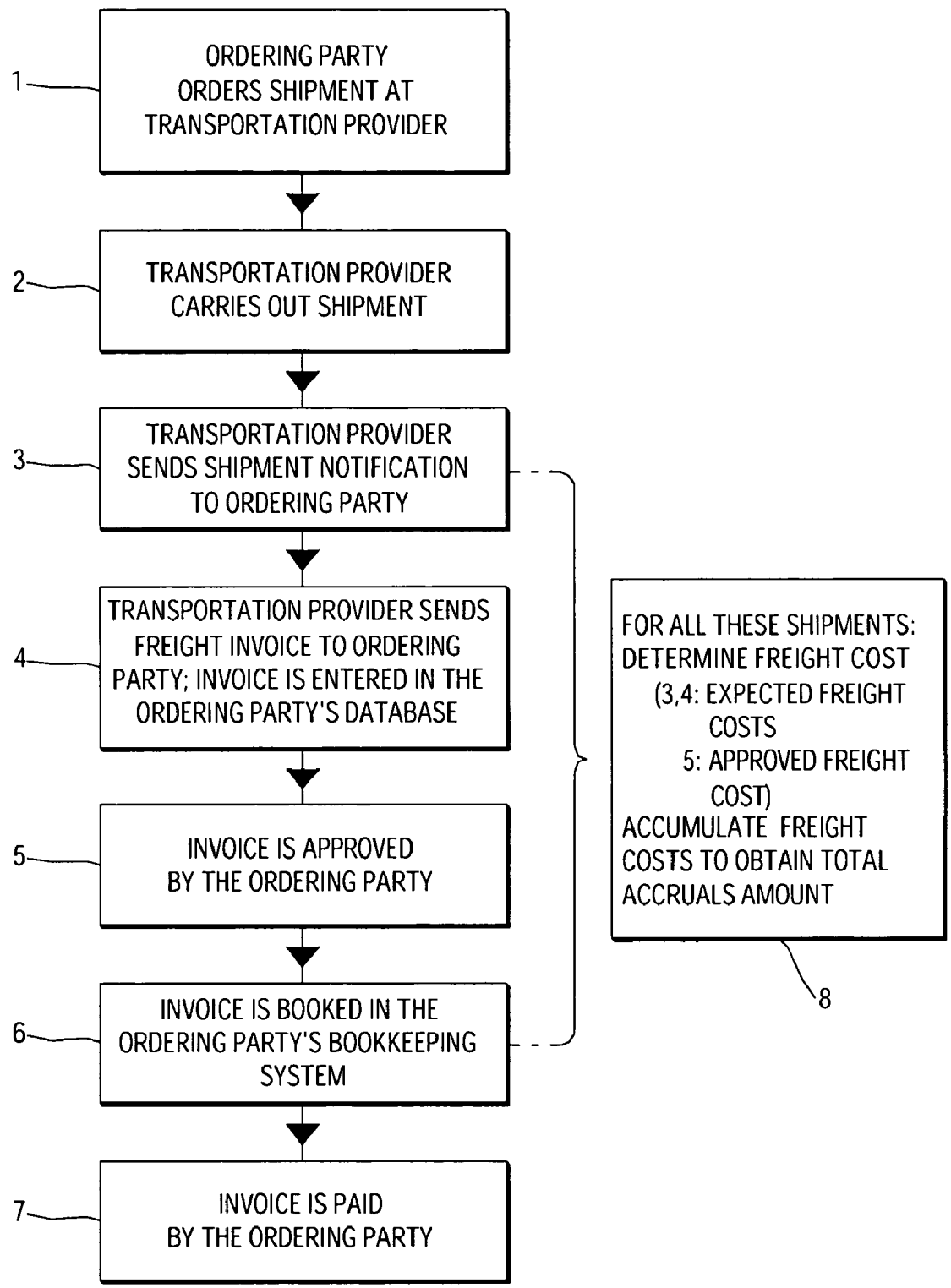
FIG. 1 is a high-level flow chart of freight-cost processing, including determination of freight-cost accruals.

FIG. 1 is a high-level illustration of freight-cost processing including accruals determination. At 1, an ordering party places orders with a transportation provider. At 2, the transportation provider carries out the shipment. At 3, the transportation provider sends a shipment notification (confirming that the shipment has been carried out) to the ordering party. Later, at 4, the transportation provider sends an invoice for the shipment to the ordering party. The invoice (more precisely: a representation of the invoice) is entered into the ordering party's database. As a result of an auditing procedure, the invoice is approved by the ordering party at 5. Following the approval, at 6, the invoice is booked in the ordering party's bookkeeping system. Finally, at 7, the invoice is paid by the ordering party.

The freight costs are incurred at 3, when the ordering party receives the shipment notification from the transportation provider. At 6, the freight costs for this shipment are automatically entered, through the bookkeeping system, in the ordering party's balance.

In order to enable the ordering party to take into account the incurred freight costs, before they are booked, the freight costs for all shipments which are at a stage between blocks 3 and 6 are determined and accumulated to obtain the total accruals amount, as indicated at 8. For shipments in the stage between 3 and 4 (i.e. shipment with shipment notification, but without invoice) the expected freight costs are calculated by the ordering party on the basis of input data available to the ordering party, without a need to obtain a pre-advice of the expected costs from the transportation provider. For shipments in the stage between 5 and 6 (i.e. shipments with approved, but not yet booked invoices), the approved freight costs are used. For shipments in the stage between 4 and 5 (i.e. shipments with not yet approved invoices), in some embodiments the expected freight costs are calculated and used in the accumulation, as in the stage between 3 and 4, in other embodiments the invoice amount is used, and in still other embodiments, these two amounts are compared and, in the case of a deviation, a re-calculated amount is used for the accumulation. The re-calculated amount may be the larger one of the two compared amounts, the smaller one of them, or an intermediate value, e.g. the mean of the two compared amounts. Preferably, in order to be on the "safe side", the larger one of the two compared amounts is used.

In large and medium-sized corporations, receivables and payables are usually allocated to certain sub-units of the corporation, called "cost units". For example, the cost units may be the different products or product lines, different business units or business sub-units or clients of the corporation, or the countries in which the corporation is active. Cost units may also be unions or intersections of some or all of these items, for example product lines in different countries.

Figure 2:
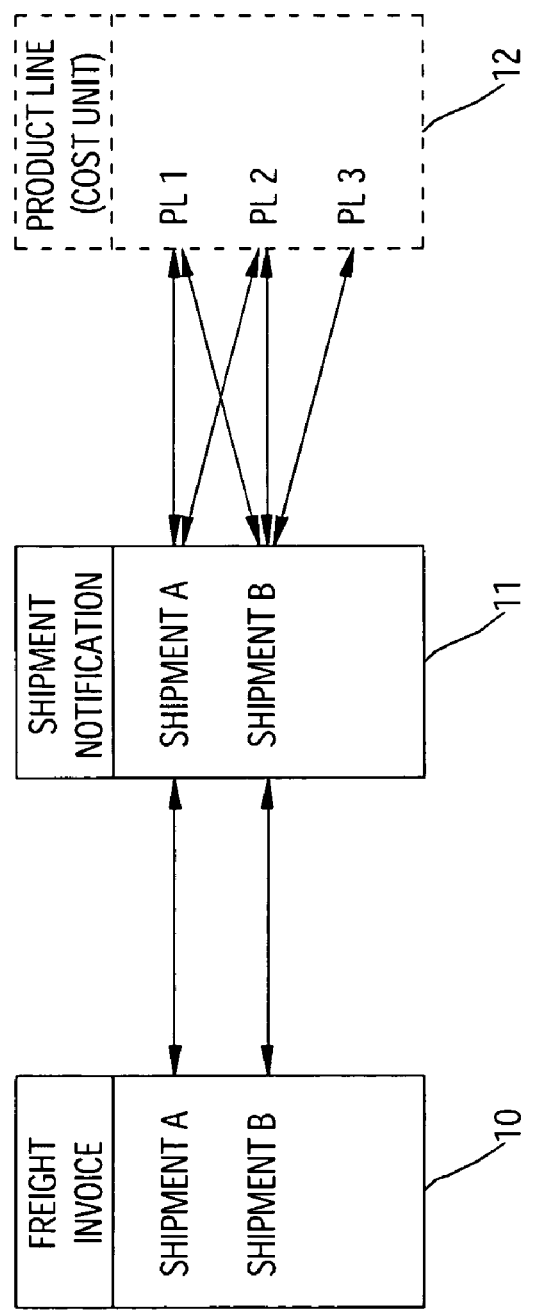
FIG. 2 illustrates an exemplary relation between shipments and cost units.

FIG. 2 illustrates an exemplary relation between shipments and cost units, here "product lines". Typically, a transportation provider is not aware of how the shipment orders carried out by him relate to cost units. For example, the transportation provider will get the order to carry out two shipments ("shipment A" and "shipment B" in FIG. 2). Since the transportation provider is not aware of product lines, he will typically only be able to issue a shipment notification (11 in FIG. 2) confirming that the shipments A and B have been carried out (in some embodiments, he may issue an individual shipment notification for each shipment). Similarly, the freight invoice (10 in FIG. 2) issued by the transportation provider will only indicate the shipments A and B and the freight costs associated with them. For example, if the transportation provider has to transport parcels, each parcel may contain products associated with different product lines. The parcels of shipment A, for example may contain desk top computers, associated with product line PL 1, as well as computer screens, associated with product line PL 2. The ordering party knows what products associated with which product lines are in the parcels, and, furthermore, what fraction of the transported weight, the transported volume or another entity indicative of product-line allocation (such as number of transported units, if the different products are transported separately) are assigned to the different cost units. For example, 90 weight-% of the parcels of shipment A may be due to the computers (product line PL 1), and 10 weight-% may be due to the computer screens (product line PL 2). In the example of FIG. 2, shipment B may be allocated in an analogous way to different product lines (here to all three product lines PL 1 to PL 3) and with different weight ratios. Of course, absolute weights may be specified rather than ratios (for example, rather than indicating 90% PL 1 and 10% PL 3, the absolute total weight of a parcel and the products in it may be specified, e.g. parcel: 10 kg, desk top computer 9.5 kg, computer screen 0.5 kg). Since the product line-specific information is available to the ordering party, in some of the embodiments it splits up all shipment-related cost amounts, such as calculated expected freight cost, re-calculated expected freight costs, invoiced freight costs, approved freight costs, into the individual cost units and allocates these amounts to the cost units, as illustrated in FIG. 2 by the product-line-specific cost list 12 and the displayed cost-reference between shipments and product lines.

Before proceeding further with the detailed description of FIGS. 3 to 7, a few items of the embodiments will be discussed.

As mentioned above, in some of the embodiments the freight cost accruals are individually determined for different cost units. Input data are used comprising shipment-related data, at least some of which is related to the cost units. The expected freight costs for the shipments are calculated, split-up into cost units, on the basis of the input data. The cost-unit individual freight cost accruals are obtained by accumulating the expected freight costs individually for different cost units.

Figure 3:
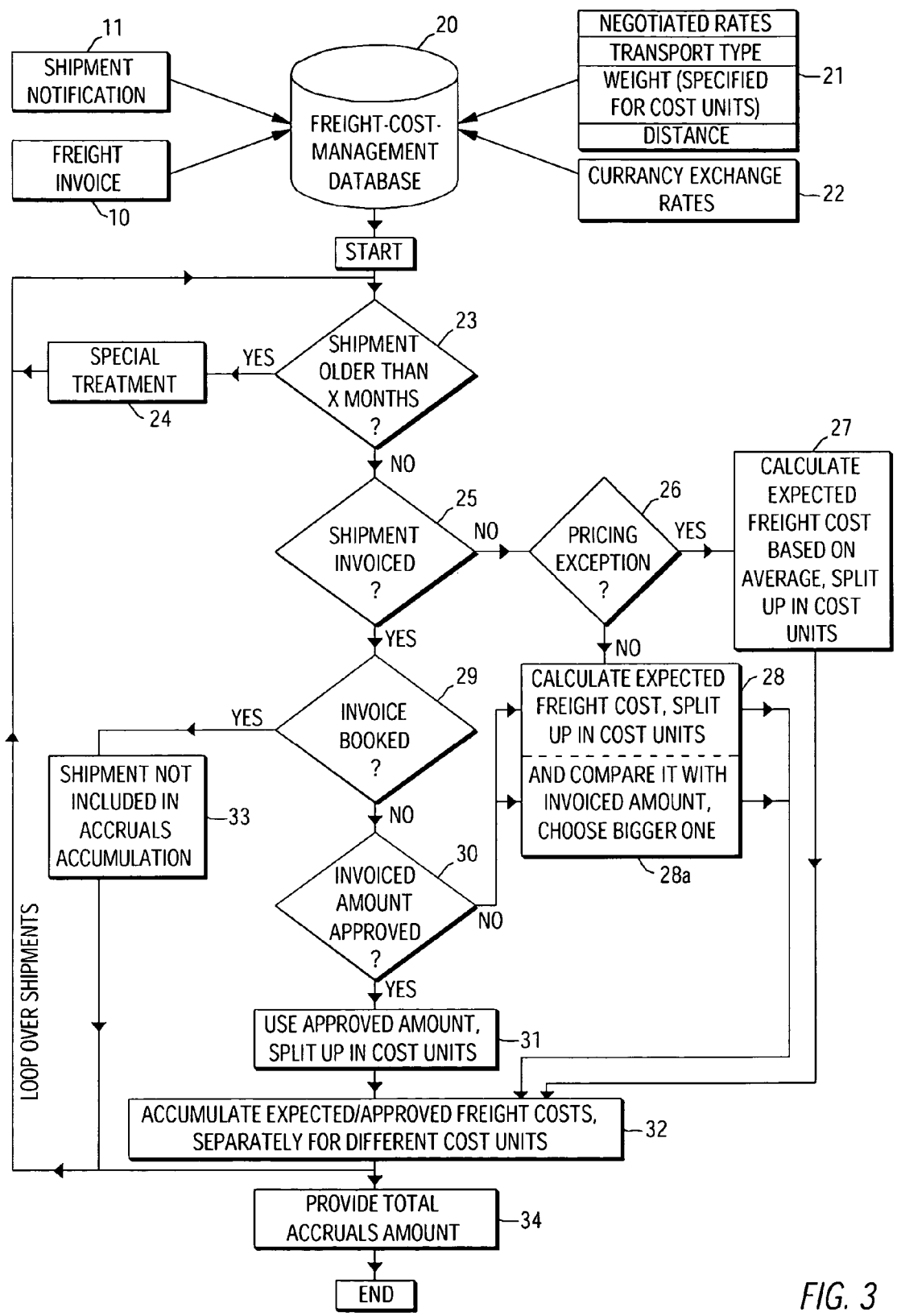
FIG. 3 is a flow diagram of a method of determining freight-cost accruals.

As will be seen in connection with FIG. 3 in more detail, in some of the embodiments, this determination of the freight cost accruals is automatically carried out, for example as a process (i.e. a computer program) executed in a computer system. However, such automatic processing may optionally include the ability of a human operator to monitor intermediate results of the process (e.g. individual estimated freight costs, before they are accumulated, or already accumulated accruals) and to intervene, for example, by changing intermediate or final results obtained by the automatic process, or by changing input data and/or parameters and re-running the automatic process.

In some of the embodiments, accruals determination is carried out at regular intervals, e.g. monthly, weekly or even daily. In other embodiments, each new shipment notification (or a certain number of new shipment notifications) triggers the accruals-determination process.

As already mentioned above, in some of the embodiments, accruals determination is carried out by the ordering party solely on the basis of input data available to the ordering party, without a need to obtain a pre-advice of the freight costs from the transportation provider (incidentally, the role of the ordering party may be partly or totally taken over by an accruals service provider acting for the ordering party; the term "ordering party" therefore also includes herein such service providers acting for the ordering party). However, in some of the embodiments, such pre-advice of freight costs may be used in addition to, or instead of, calculated expected freight costs; these pre-advised freight costs are then split up into cost units, on the basis of the ordering party's input data, as explained above.

In some of the embodiments, the shipment-related input data on which the freight-cost accruals determination is based includes at least one of transport distance, transport type (e.g. road transport, railway transport, air freight, etc.), transported weight, transported volume, number of transported units, transport rate agreed with the respective transportation provider (e.g. agreed price per km and kg), agreed total price, transport fees (e.g. fees of air freight carriers) and an identifier of the transportation providers for the different shipments.

In some of the embodiments in which individual freight cost accruals for different cost units are determined, the input data include information permitting an allocation of costs to the different cost units. For example, this may be an indication what fractions of the transported weight, transported volume or number of transported units are associated with different cost units. As mentioned above, these fractions can, of course, be represented by absolute numbers of weight, volume, number of units, etc. Of course, a cost-unit specific allocation does not imply that every amount has to be split up; it rather refers to the ability to split up amounts: in the case of a shipment that is entirely associated with a single cost unit (e.g. a single product line), the input data will include a corresponding indication (e.g.: 100 weight-% to product line PL 1), and the entire freight cost for this shipment will be allocated to this single cost unit.

As already explained in connection with FIG. 1, in some of the embodiments it is ascertained whether an invoice for a shipment has already been received and booked. If the answer is positive, the expected freight cost for this shipment is not calculated, or (in embodiments in which the expected freight costs are calculated for all shipments) not included in the accruals accumulation for this shipment. Booked freight costs are often automatically taken into account in the ordering party's balance; accordingly, they need not be considered in the accruals calculation.

In some of the embodiments a further distinction is made between approved and not yet approved invoices. For example, if an invoice has already been approved (but not yet booked) the expected freight cost for this shipment is not calculated (or not included in the accumulation), but rather the approved amount is used in the accumulation of the freight costs. In some of the embodiments, if an invoice has not yet been approved, the invoiced amount is compared with the calculated expected freight cost for the shipment under consideration. If a deviation is found between the invoiced amount and the calculated expected freight cost, in some of the embodiments the larger of the two amounts is used as the expected freight cost for this shipment in the accumulation. In other embodiments, an intermediate value or the smaller of the two amounts is used as the expected freight cost. Small differences between the two amounts are not necessarily considered as a "deviation"; in some embodiments, the difference has to exceed a predefined threshold value to be considered as a "deviation".

If a different amount than the calculated expected freight cost (e.g. the invoice amount, the approved amount, or an intermediate value between the calculated and invoiced amounts) is used in the accumulation, it is split up into different cost units in the same manner as the calculated expected freight cost, on the basis of the cost-unit related input data (in the example of a 90%:10% split-up mentioned above in connection with FIG. 2, 90% of the approved amount for shipment A will be allocated to product line PL 1, and 10% of it to product line PL 2).

Embodiments of the computer program products with program code for performing the described methods include any machine-readable medium that is capable of storing or encoding the program code. The term "machine-readable medium" shall accordingly be taken to include, but not to be limited to solid state memories, optical and magnetic storage media, and carrier wave signals. The program code may be machine code or another code which can be converted into machine code by compilation and/or interpretation, such as source code in a high-level programming language, such as C++, or in any other suitable imperative or functional programming language, or virtual-machine code.

Returning now to FIG. 3, it illustrates in more detail an exemplary method of accruals determination by means of a flow diagram. The process is carried out by the ordering party using the ordering party's freight-cost management database 20. The data stored in the database 20 includes shipment-related input data 21, such as negotiated rates (which will typically be transportation-provider-dependent, but will not depend on individual shipments), transport type, weight to be transported, distance, etc. The input data 21 includes an indication enabling freight costs to be split up into different cost units; for example, fractions of the weights transported may be specified in a cost-unit-individual way, as explained above. Tables with data representing shipment notifications 11 and, if already available, freight invoices 10 are also stored in the database 20. Since negotiated rates, freight invoices, etc. may specify amounts in different currencies, but the accruals are typically only determined in a single currency (e.g. USD or EUR), the database 20 also stores currency-exchange rates 22 enabling amounts in other currencies to be converted in the single accruals-currency.

The process which will now be described is consecutively carried out for all stored shipments. At 23, it is ascertained whether the shipment under consideration is older than a certain number of months (e.g. three months). If the answer is positive, at 24 a special activity is performed with this shipment; e.g. a report is generated with a reason code indicating why the shipment is so old (e.g. the reason code could indicate that no invoice has been received). If the outcome at 23 is negative, it is ascertained at 25 whether the shipment has already been invoiced. To answer this question, the shipment notifications 11 and the freight invoices 10 in the database 20 are matched (correlated). For example, each shipment may have a unique identifier which appears both in the shipment notification table and the freight invoice table as an attribute of the shipment notifications and freight invoices. The matching between these tables may already have been carried out once, when the process is started, or when block 25 is entered for the first time. If the answer at 25 is negative, i.e. if no invoice could be found for the present shipment, it is ascertained, at 26, whether there is a pricing exception. "Pricing exception" means that the expected freight cost cannot be calculated in the normal manner (as explained below), for example due to an exceptional lack of sufficiently meaningful input data. If the answer at 26 is positive, the expected freight cost is calculated at 27 on the basis of average values; it may also be split up in cost units on the basis of average split-up values, if the information required therefore is exceptionally not available for the present shipment in the input data 21. If there is no pricing exception, the expected freight cost for this shipment is calculated at 28. The calculation is based on the input data 21. For example, if the input data 21 indicates a transport distance of x km, a transported weight of y kg, and a negotiated rate of z USD per km and kg, the expected freight cost is obtained by multiplying x by y and by z. At 28, the calculated expected freight cost is also split up in cost units. For example, if the input data 21 indicate that 90 weight-% belong to product line PL 1, and 10 weight-% to product line PL 2, the calculated expected freight cost is split up so that 0.9 times xyz is allocated to PL 1 and 0.1 times xyz is allocated to PL 2.

If, however, it is determined at 25 that the shipment has already been invoiced, it is ascertained at 29 whether the invoice has already been booked. If the answer is positive, the shipment is not included in the accruals accumulation (at 33), i.e. the accumulation at 32 is skipped, and the loop proceeds with the next shipment.

If the invoice has not yet been booked, it is ascertained, at 30, whether the invoiced amount has already been approved. If the answer is positive, the approved amount is used in the subsequent accumulation, split up in cost units, as explained in connection with box 28. If the invoiced amount has not been approved, the amount of the expected freight costs is calculated at 28. In addition, it is compared, at 28a, with the invoiced amount and the larger of these two amounts is chosen in the subsequent accumulation. The chosen amount is split up in cost units, as explained above.

At 32, the expected or approved freight cost (i.e. the results of 28, 28/28a, 27 or 31) is accumulated, i.e. added to the sum of the results of previous loop cycles, separately for different cost units.

Then, a new loop cycle starts. When the last shipment has been processed, the total accruals amount (separately for different cost units) is provided at 34, for example in the form of an accruals output file.

A human operator may intervene at the level of expected freight costs for individual shipments (i.e. before box 32), or at the level of accumulated accruals, e.g. at step 34, and may either adjust calculated freight cost amounts or parameters or input data and then re-calculate the accruals.

Figure 4:
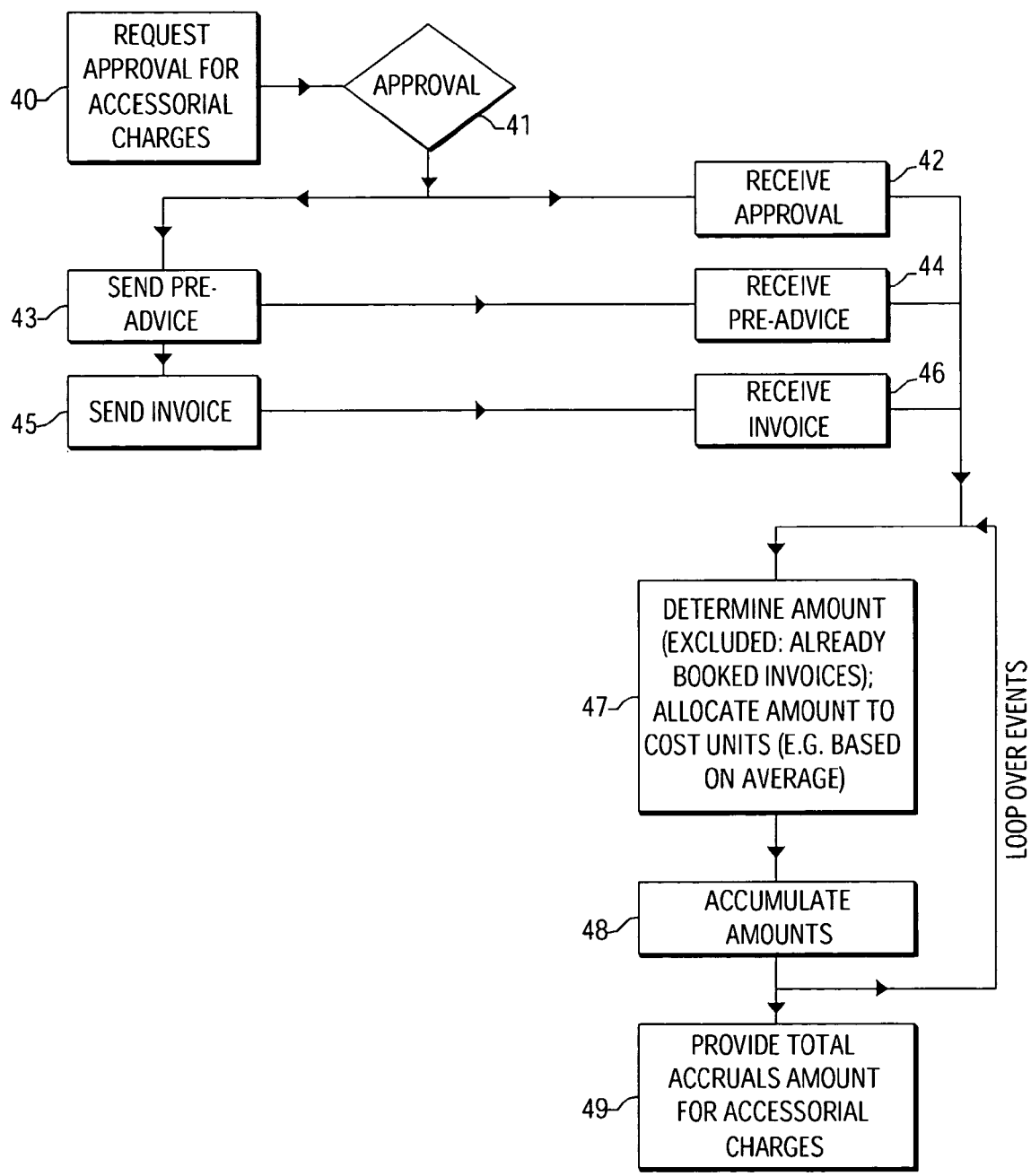
FIG. 4 is a flow diagram illustrating a method of determining accruals for accessorial charges.

In certain circumstances, there may be additional freight costs which cannot be predicted, in contrast to the predictable "normal" freight costs treated in connection with FIG. 3. Such additional freight costs, for example, may incur at the transportation provider's side due to unexpected waiting periods, fees for exceptional handling of goods, etc. These additional costs are also called "accessorial charges". FIG. 4 is a flow diagram illustrating a method of determining accruals for accessorial charges.

At 40, a transportation provider ("carrier" in FIG. 4) requests an approval for accessorial charges from the ordering party. The approval 41 is a pre-approval that renders the subsequent accruals determination more precise. The final approval (and payment) is carried out at a later stage, and is not included in FIG. 4. At 41, the ordering party's responsible unit ("business unit" in FIG. 4) approves the request and sends the approval to the ordering party's accruals-determination unit and to the carrier. At 42, the accruals-determination unit receives the approval. The carrier may send a pre-advice at 43, or an invoice at 45, which is received at 44 or 46. At 47, the accessorial-charges-amount is determined; it will normally match the amount approved at 41. As with the predictable freight costs handled in FIG. 3, accessorial charges which have already been invoiced and booked are excluded since they are automatically included in the ordering party's balance. The amount determined is allocated to the ordering party's cost units, for example based on average allocation values. At 48, the determined and allocated amount is accumulated, i.e. added to previously determined amounts. The activities 47 and 48 are carried out in a loop over all the events in which accessorial charges have been approved. At 49, the total accruals amount for accessorial charges is provided, split up according to the ordering party's cost units. Finally, the total accruals amount for accessorial charges obtained at 49 may be added to the total accruals amount obtained at 34 in FIG. 3.

FIG. 5 shows an exemplary accruals table 50 which is produced as a result of the process shown in FIG. 3 (it may optionally also include accruals for accessorial charges, as obtained in FIG. 4). The exemplary accruals table 50 has several attributes, such as "accounting file", "product line", "amount", and "month". The first five lines of the exemplary table refer to a single month, the next five lines to another single month. The first four lines of each month refer to different product lines, the last line of each month refers to a sum of all product lines. These two different types of lines are differentiated by different accounting file numbers in the accounting file attribute. The product lines are identified by different product-line identifiers in the product-line attribute (the "sum of product lines" is identified by a "0"). The numbers in the amount attribute are the total accruals amounts for the respective product lines and months, expressed in the currency used for accruals determination. The data given in the month attribute specify the time periods to which the respective accrual amounts refer.

Figure 6:
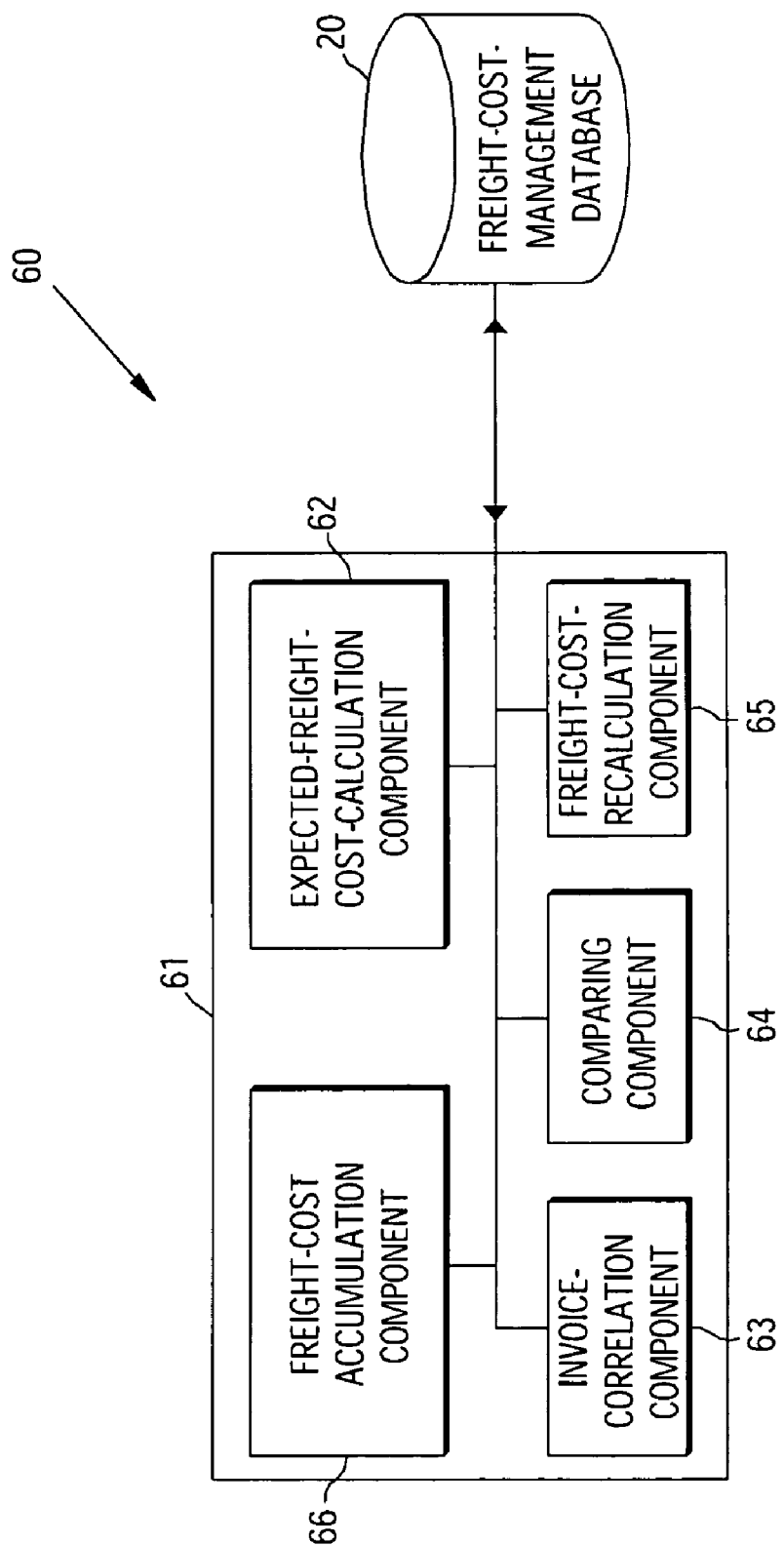
FIG. 6 is a functional high-level view of a computer system for determining freight-cost accruals.

FIG. 6 shows a high-level functional architecture diagram of an exemplary computer system 60 programmed to perform the methodologies described herein. The computer system 60 includes an application logic 61 coupled to the freight-cost-management database 20 (which may either be a part of the computer system 60, or a separate database). The application logic 61 has an expected-freight-cost calculation component 62, an invoice-correlation component 63, a comparing component 64, a freight-cost-recalculation component 65, and a freight-cost-accumulation component 66. It should be noted that this subdivision in several components is functional and does normally not imply a corresponding structural division. The functional components 62 to 66 can, of course, be merged with other functional components, for example any of the functional components 22 to 66, or can be made of several distinct functional sub-components.

The expected-freight-cost-calculation component 62 is arranged to calculate the expected freight costs and split them up in cost units, for example as explained in connection with 28 of FIG. 3. The invoice-correlation component 63 is arranged to correlate shipment notifications and freight invoices, e.g. the shipment notification table 11 and the freight invoice table 10 of FIG. 3. The comparing component 64 is arranged to compare approved invoiced amounts with calculated expected freight cost amounts, as explained above, for example in connection with 28a of FIG. 3. The freight-cost recalculation component 65 is arranged to choose the bigger one of the two values, if a deviation is found, as explained above, for example in connection with 28a of FIG. 3. The freight-cost accumulation component 66 is arranged to accumulate the expected and approved freight costs, separately for different cost units, as explained above, for example, in connection with 32 of FIG. 3. The computer system 60 and the application logic 61 can be implemented using standard hardware, operating systems and databases.

Figure 7:
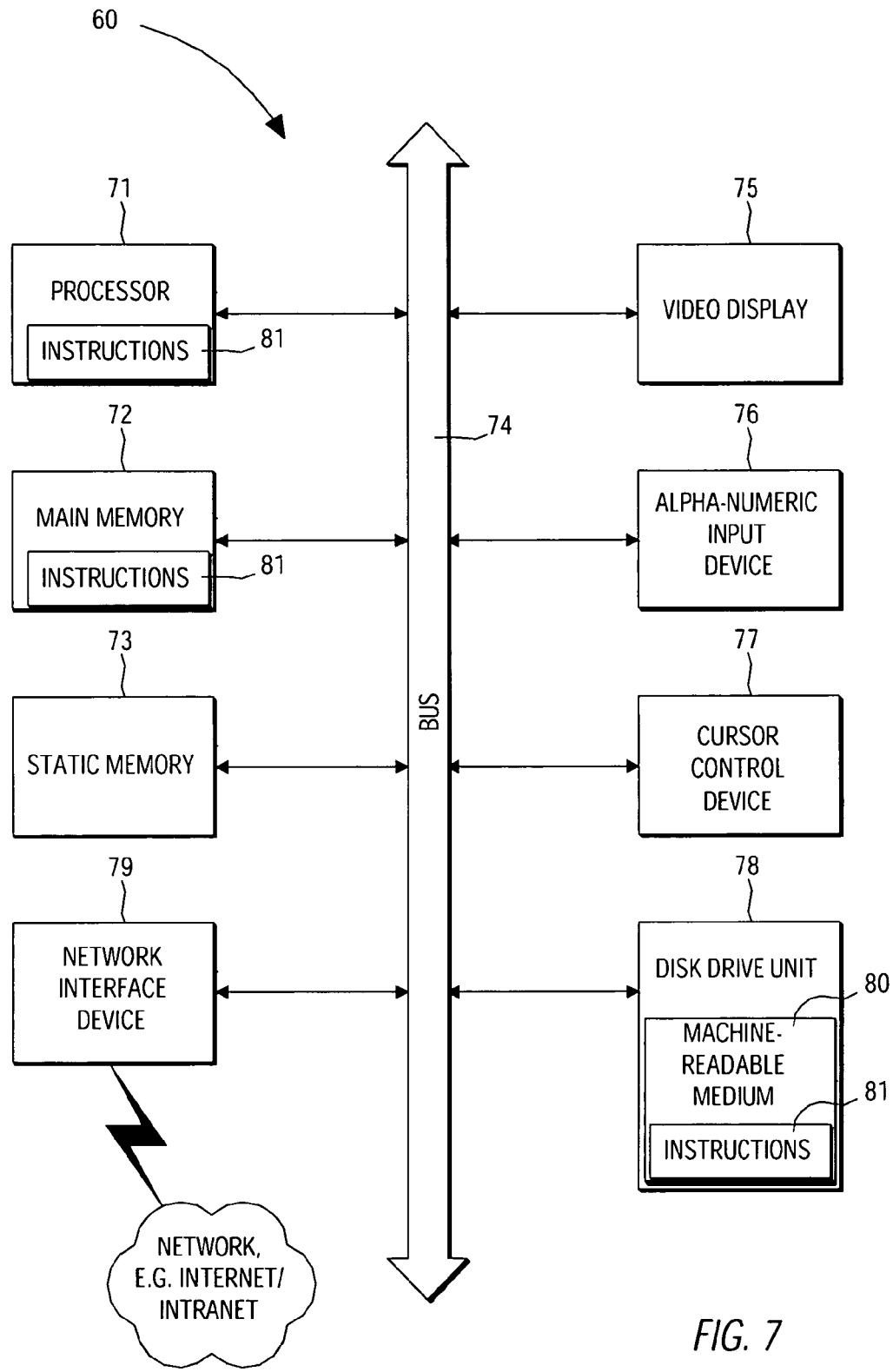
FIG. 7 is a diagrammatic structural representation of a machine (computer system) within which a set of instructions, for causing the machine to perform any of the methodologies discussed herein, may be executed.

FIG. 7 is a diagrammatic structural representation of a machine forming the computer system 60 within which a set of instructions, for causing the machine to perform any of the methodologies discussed herein, may be executed. The computer system 60 includes a processor 71 and memory 72, 73. The memory 72, 73 communicates with the processor via a bus 74. In the example of FIG. 7, the memory includes a main memory 72 and a static memory 73. The computer system 60 may include further optional components, such as a video display unit 75, an alpha-numeric input device 76, a cursor control device 77, a disk drive unit 78, and a network interface device 79. Further optional components are a disk drive unit 78 which includes a machine-readable medium 80 on which is stored a set of instructions (i.e. software) 81 embodying any one, or all, of the methodologies described above. The software 81 is also shown to reside, completely, or at least partially, within the main memory 72 and/or within the processor 71. The software 81 may further be transmitted or received via the network interface device in the form of carrier wave signals.

With the embodiments, accruals can be automatically determined without pre-advice from the provider in a precise, contemporary and automatic manner.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A computer-based method of determining freight cost accruals pertaining to shipments provided by a transportation provider for an ordering party, the method comprising the following steps conducted by the ordering party:

requesting, by an ordering party, a transportation provider to transport goods that have plural different product lines;

estimating, by a computer, a total expected freight cost from the transportation provider for transporting the goods;

calculating, by a computer, percentages of weight or volume for each different product line in the plural different product lines in order to allocate portions of the total expected freight cost to each of the plural different product lines, wherein the portions of the total expected freight cost are allocated to each of the plural different product lines before the ordering party receives an invoice from the transportation provider for transporting the goods.

2. The method of claim 1 further comprising:

receiving, by the ordering party, an invoice from the transportation provider for transporting the goods;

comparing, by the ordering party, the invoice with the total expected freight cost;

recalculating the portions of the total expected freight cost allocated to each of the plural different product lines.

3. The method of claim 1 further comprising:

calculating a total weight for the goods;

calculating a fraction of the total weight for each of the different product lines in the plural different product lines;

using the fraction of the total weight to calculate an allocation of the total expected freight cost to each of the plural different product lines.

4. The method of claim 1 further comprising:

retrieving negotiated rates from a data base for the transportation provider to transport the goods;

using the negotiated rates to estimate the total expected freight cost.

5. The method of claim 1 further comprising:

receiving input data from the transportation provider;

using, by the ordering party, the input data to estimate the total expected freight cost, wherein the input data includes a distance the goods are being transported and a total weight of the goods.

6. The method of claim 1 further comprising:

splitting, by ordering party, the total expected freight cost between each different product line in the plural different product lines before the ordering party receives an invoice from the transportation provider for transporting the goods.

7. The method of claim 1, wherein the ordering party calculates the total expected freight cost for each different product line without a need to obtain the total expected freight cost from the transportation provider.

8. The method of claim 1 further comprising, displaying, on the computer, the total expected freight cost from the transportation provider for transporting the goods.

9. The method of claim 1, wherein the transportation provider is not aware of the plural different product lines that are being shipped.

* * * * *